United States Patent [19]

Wong

[11] Patent Number: 6,058,227

[45] Date of Patent: May 2, 2000

[54] METHOD AND APPARATUS FOR AN OPTO-ELECTRONIC CIRCUIT SWITCH

[75] Inventor: Jorge J. Wong, Torrance, Calif.

[73] Assignee: Trw Inc., Redondo Beach, Calif.

[21] Appl. No.: 09/015,181

[22] Filed: Jan. 29, 1998

[51] Int. Cl.[7] .................................................. G02B 26/08
[52] U.S. Cl. ................. 385/16; 385/24; 359/128
[58] Field of Search ................ 385/16, 24; 359/115, 359/117, 123, 124, 127, 128

[56] References Cited

U.S. PATENT DOCUMENTS

| | | | |
|---|---|---|---|
| 5,170,273 | 12/1992 | Nishio | 359/128 |
| 5,208,691 | 5/1993 | Nishio | 359/123 |
| 5,276,543 | 1/1994 | Olshansky | 359/124 |
| 5,404,240 | 4/1995 | Nishio et al. | 359/123 |
| 5,432,627 | 7/1995 | Nishio | 359/117 |
| 5,450,224 | 9/1995 | Johansson | 359/128 |
| 5,524,154 | 6/1996 | Bergland et al. | 385/17 |
| 5,739,935 | 4/1998 | Sabella | 359/128 |
| 5,754,320 | 5/1998 | Watanabe et al. | 359/117 |

OTHER PUBLICATIONS

Gerd Keiser, "Optical Fiber Communications", Second Edition, 1991, pp. 400–405.

Babak Daneshrad and Henry Samueli, "A 1.6 Mbps Digital–QAM System for DSL Transmission", *IEEE Journal On Selected Areas In Communication*, vol. 13, No. 9, Dec. 1995, pp. 1600–1610.

Bennett C. Wong and Henry Samueli, "A 200 Mhz All–Digital QAM Modulator and Demodulator in 1.2–$\mu$m CMOS for Digital Radio Applications", *IEEE Journal Of Solid–State Circuits*, vol. 26, No. 12, Dec. 1991, pp. 1970–1979.

*Primary Examiner*—John D. Lee
*Attorney, Agent, or Firm*—Michael S. Yatsko

[57] ABSTRACT

A size-expandable and bandwidth upgradable opto-electronic circuit switch (10) and corresponding methodology for full broadcast routing of a plurality of signals with 100% non-blocking are provided. The opto-electronic circuit switch (10) includes at least two input transmitters (22) for receiving electrical input signals and for converting these electrical signals into a corresponding optical input signal, such that each optical input signal is at a different wavelength carrier. Next, a multiplexer (24) is used to combine these optical signals into a single optical input using wavelength division multiplexing, a fixed equalizer (25) provides the same gain response among all signals, and an amplifier (26) optically amplifies this optical signal received from the multiplexer. A splitter (28) receives this amplified optical signal from the amplifier (26) and transmits it as a plurality of optical output signals to at least two optical receivers (30). Each optical receiver (30) selects one of the optical input signals from the optical output signal by its wavelength, and then converts this selected signal into an electrical output signal. Optional RF and digital subsystems are also provided to maximize the bandwidth utilization and further increase the number of input and output ports.

33 Claims, 4 Drawing Sheets

METHOD AND APPARATUS FOR AN OPTO-ELECTRONIC CIRCUIT SWITCH

BACKGROUND OF THE INVENTION

1. Field of the Invention

This invention relates generally to a hybrid electronic and optical circuit switch architecture and, more particularly, to an opto-electronic circuit switch that is able to route analog and digital signals of any bandwidth using a full-broadcast and non-blocking scheme, and is relatively simple to expand.

2. Discussion of the Related Art

Switches perform the routing and distribution of signals in communication systems and have played a pivotal role since the invention of the telephone. Traditionally, these switches were electrical in nature; distributing the information contained in an electrical signal. Over years, data rates, sizes and complexities for communication networks have increased due to greater technological advances in high-speed data communications. The requirements of switches have gone beyond the capabilities of electrical switches, and therefore alternative switching strategies are needed. Today, these switches allows video to join data and voice signals to create multimedia communication systems.

In circuit switch networks, there is always a need for circuit switches with higher number of input/output ports that handle faster data rates per port. Currently, analog circuit switches can route and distribute analog signals of a fixed bandwidth for which it was built, and digital switches typically support only up to 32 1.2 Gbps data streams. In addition, there is a need for a circuit switch that provides 100% non-blocking and also supports full broadcasting. For instance, the Clos switch architecture has full broadcasting capabilities, but offers some probability of blocking certain switching routes.

Moreover, today's switches are based on electronic fabrics made by commercial manufactures; however, some of these companies do not plan or are not able to make faster switch fabrics. Upgrading the analog or digital bandwidth of existing circuit switches is not possible once they have been manufactured. Expanding their size is relatively difficult, expensive and time consuming.

Within the next ten years, circuit switches will need to increase capability in order to support higher bandwidths and larger networks. Opto-electronic switching architectures are an alternative that may meet these criteria while providing more flexibility in size and bandwidth expansion at a lower cost than other architectures.

Therefore, it is desirable to provide a high-bandwidth circuit switching architecture with full broadcasting and non-blocking capabilities. These circuit switches should be expandable in size and upgradable in bandwidth, while maintaining backwards compatibility with existing systems. The opto-electronic circuit switch of the present invention will utilize wavelength division multiplexing, as well as (optionally) frequency division multiplexing and quadrature amplitude modulation to achieve these requirements. To implement this architecture, it is desirable to utilize commercial off-the-shelf components to facilitate expansion, and yet reduce the need for other various expensive optical and electrical components.

SUMMARY OF THE INVENTION

In accordance with the teachings of the present invention, a opto-electronic circuit switch is provided for routing a plurality of signals The opto-electronic circuit switch comprises an optical transmitter subsystem for receiving a plurality of input signals and at least two optical receiver units which serve as destinations for these input signals. Optical transmitter subsystem includes at least two input transmitters for receiving electrical input signals and for converting these electrical signals into a corresponding optical input signal, such that each optical input signal is at a different wavelength carrier. Next, a multiplexer is used to combine these optical signals into a single optical input using wavelength division multiplexing, and an amplifier optically amplifies this optical signal received from the multiplexer. A fixed equalizer between the multiplexer and amplifier provides the same gain response among all signals. A splitter receives this amplified optical signal from the amplifier and transmits it as a plurality of optical output signals to at least two optical receivers. Each optical receiver selects one of the optical input signals from the optical output signal by tuning to its wavelength, and then converts this selected optical signal into an electrical output signal.

In one preferred embodiment, a plurality of optical transmitter subsystems are used to receive a plurality of input signals, and each of the optical receiver units further includes a switch for selecting an optical output signal from one of the optical transmitter subsystems. In addition, the optical components of the circuit switch are combined with an electronic RF subsystem to increase the number of switch inputs. By using frequency division multiplexing and quadrature amplitude modulation, a plurality of wide-band analog signals can be combined and inputted into this opto-electronic architecture.

BRIEF DESCRIPTION OF THE DRAWINGS

Other objects and advantages of the present invention will be apparent to those skilled in the art upon reading the following detailed description and upon reference to the drawings in which.

DETAILED DESCRIPTION OF THE PREFERRED EMBODIMENTS

The following description of the present invention is merely exemplary in nature and is in no way intended to limit the invention or its uses. Moreover, the following description, while depicting a particular circuit switch configuration, is intended to adequately teach one skilled in the art to make and use an opto-electronic circuit switch that combines the principles of wavelength division multiplexing, frequency division multiplexing and quadrature amplitude modulation.

Figure 1:
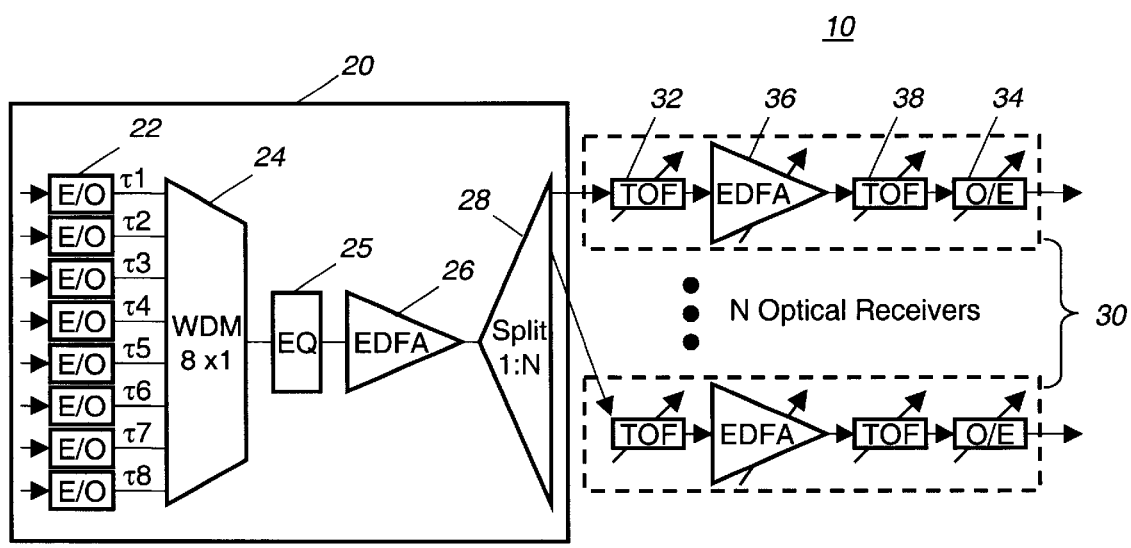
FIG. 1 is a matic block diagram showing a first embodiment of an opto-electronic circuit switch of the present invention.

An opto-electronic circuit switch 10 for providing full broadcast routing of a plurality of signals is illustrated in FIG. 1. Circuit switch 10 comprises an optical transmitter subsystem 20 for receiving a plurality of input signals and at least two optical receiver units 30 which serve as destinations for these inputted signals.

The basic components of optical transmitter subsystem 20 include electrical-to-optical (E/O) transmitters 22, a wavelength division multiplexer 24, a fixed optical equalizer 25, an optical amplifier 26, and a splitter 28. Opto-electronic circuit switch 10 utilizes up to eight (8) E/O transmitters 22 for receiving electrical input signals, such that each E/O transmitter 22 converts and transmits this input signal into an optical signal. Each E/O transmitter 22 uses a different wavelength carrier around the 1550-nm band. Multiplexer 24 combines these signals using wavelength division multiplexing (WDM) into a single optical signal which in turn is optically amplified by an optical amplifier 26. Since several signals are combined in this subsystem, only one EDFA and one splitter are needed per subsystem, reducing the cost and size of the switch. Optical equalizer 25 compensates the differences in insertion loss in the WDM among the signals and pre-compensates the non-flat gain response of optical amplifier 26 in order to equalize the performance quality among all signals. An erbium-doped fiber amplifier (EDFA) is preferred because they provide higher gain, larger bandwidth, increased power and lower noise than other semiconductor optical amplifiers. It is also envisioned that other optical couplers may replace multiplexer 24, but a wavelength division multiplexer is preferred because it provides better isolation between channels and has lower insertion loss. Splitter (1:N) 28 fully broadcasts all of the input signals by transmitting the one optical signal from the amplifier to each of the optical receiver units 30. Since each optical signal is transmitted to each optical receiver unit 30, circuit switch 10 also provides a non-blocking architecture.

Each optical receiver unit 30 includes a tunable optical filter (TOF) 32 for selecting with low crosstalk and noise one of the optical input signals from the transmitted optical signal using the desired wavelength and an optical-to-electrical (O/E) receiver 34 to convert the selected optical signal back to an electrical signal. In addition, each optical receiver unit 30 may also include a second EDFA 36 to boost the selected wavelength carrier to the desired power level and a second TOF 38 to further reduce optical crosstalk and amplifier noise before the optical signal passes to O/E receiver 34. Second EDFA 36 has an automatic gain control, which accurately maintains the desired power into O/E receiver 34 to meet the link gain and noise requirements and compensates for the differences in insertion loss among the signals in splitter 28 and TOF 32. Alternatively, a variable optical attenuator, in place of second EDFA 36 and second TOF 38, may be used to ensure that the optical power into O/E receiver 34 is not too high.

Depending on the E/O's and O/E's used, circuit switch 10 can route either analog and/or digital signals of any bandwidth (or data rate). Since optical components are transparent to electrical signals, ports of different bandwidths and formats (analog or digital) can coexist in the same switch, making the switch 10 flexible and backward-compatible. Furthermore, the bandwidth of the switch ports can be increased by replacing the corresponding E/O and O/E. All of the components are generally interchangeable and connected with fiber optic cables, and thus facilitates different implementations for opto-electronic circuit switch 10. Use of interchangeable components also allows for easy and inexpensive expansion of this circuit switch architecture.

Figure 2:
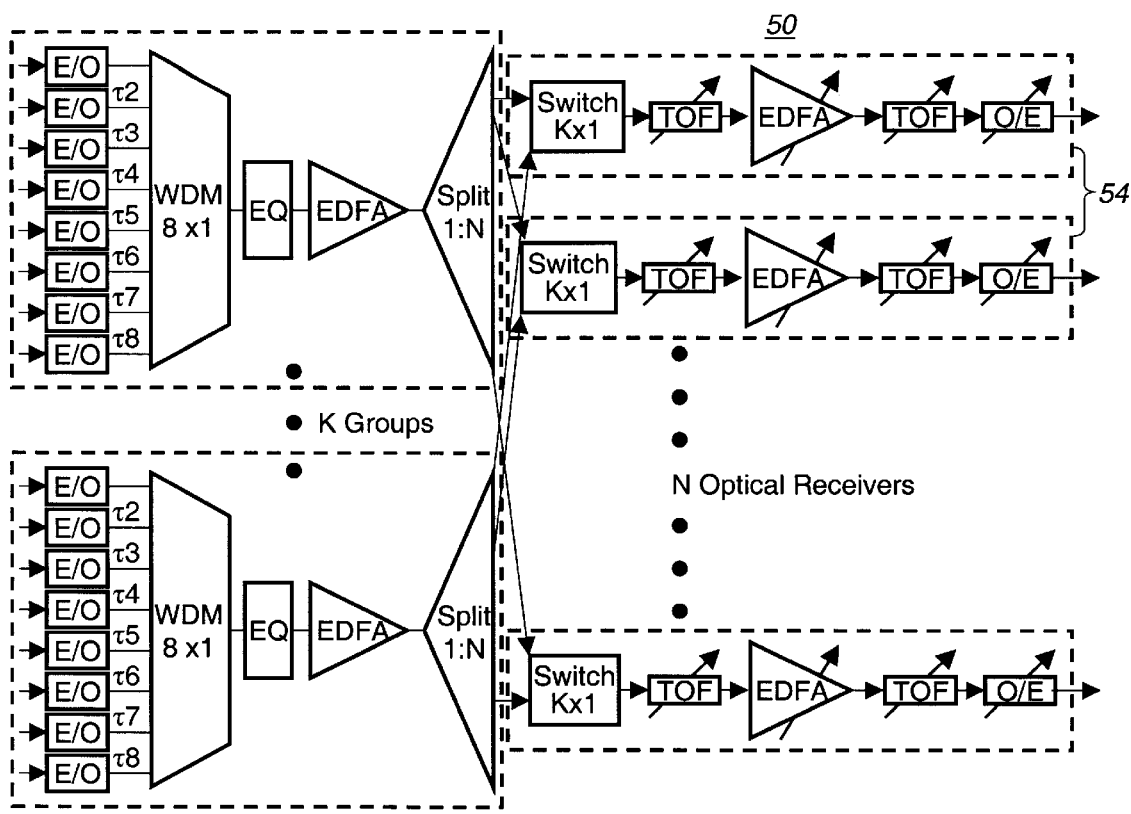
FIG. 2 is a schematic block diagram showing a second embodiment of an opto-electronic circuit switch of the present invention.

A second embodiment of an opto-electronic circuit switch 50 which provides more flexibility in size expansion is shown in FIG. 2. Circuit switch 50 employs the same architecture as discussed above, except that the switch supports 8×K input ports by using K optical transmitter subsystems 52. Each optical receiver unit 54 also requires a K×1 switch 56 to select the optical transmitter subsystem from which to receive a signal. To support expandability, the K×1 switch should be large (e.g. 32×1) even if only a few subsystems are initially implemented in switch 50. In this embodiment of circuit switch 50, adding input ports merely requires adding another wavelength carrier or another optical transmitter subsystem or group of wavelength carriers. The wavelengths in a subsystem may be the same as those in another subsystem. Additional output ports requires splitting the signal further (i.e. increasing N or coupling an additional splitter into an output of the existing splifter) and adding a corresponding optical receiver unit.

Figure 3:
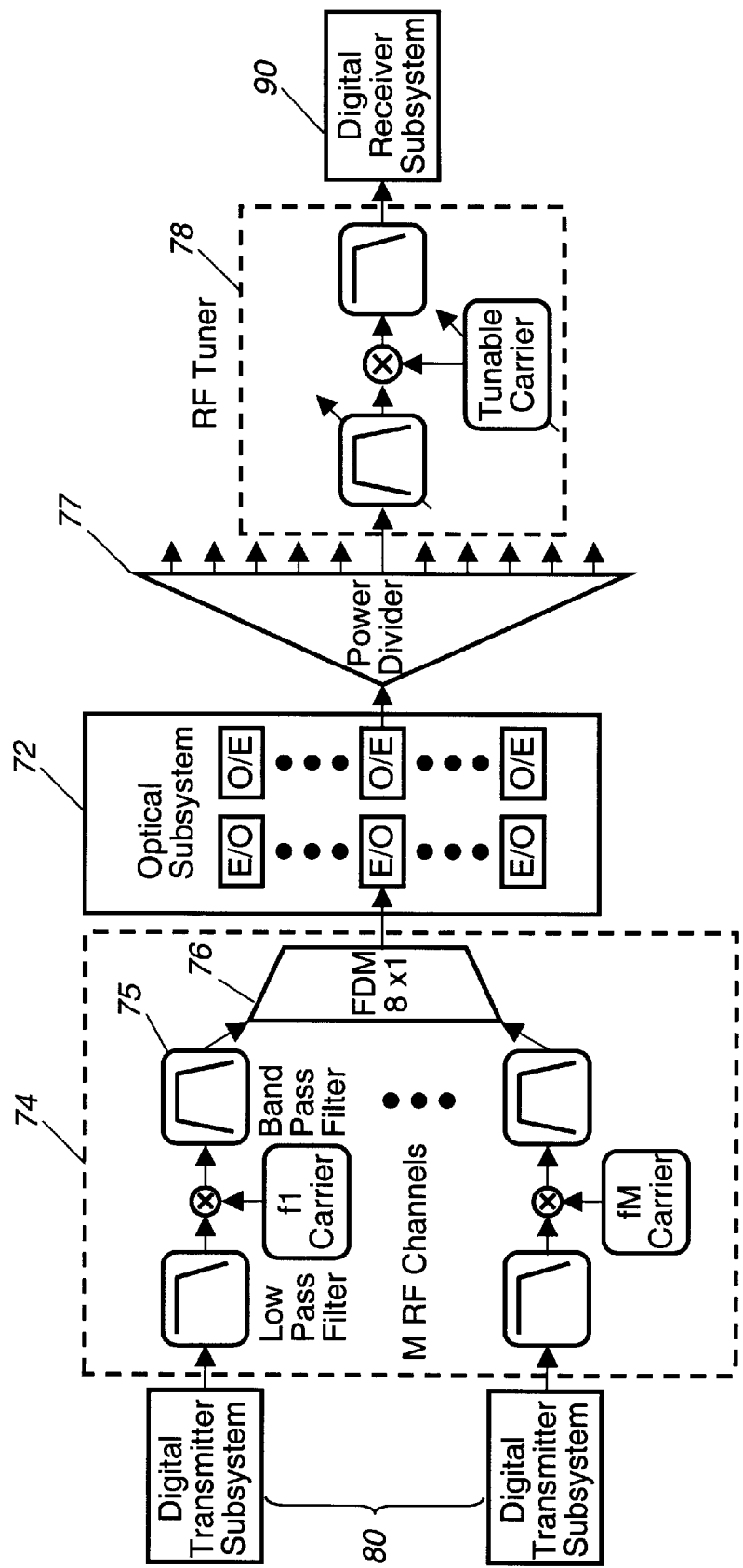
FIG. 3 is a schamatic block diagram showing an RF system which may be used with the opto-electronic circuit switch of the present invention.

To further expand switch size, an opto-electronic circuit switch 70 architecture can be coupled with an RF subsystem and digital subsystem, as seen in FIG. 3. In the present invention, optical subsystem 72 is identical to the architecture described above. By combining the principles of frequency division multiplexing and wavelength division multiplexing, the number of input ports for circuit switch 70 can be increased. In RF subsystem 74, a multiplexer 76 combines M wide-band analog signals using frequency division multiplexing. Each input signal occupies a different frequency band as assigned by the frequency translator 75 within the bandwidth supported by the various RF, E/O, O/E components. Thus, E/O and O/E components must be made to support analog signals. RF channels may be repeated at different E/O transmitters, but they do not overlap in the fiber optic cable since each E/O transmits at a different wavelength carrier. A combined source signal from this RF transmitter subsystem is transmitted to each of the E/O transmitters in optical subsystem 72. After passing through optical subsystem 72, an RF tuner 78 associated with an O/E output receiver from optical subsystem 72 is used to choose the desired RF channel. RF tuner 78 is similar to a heterodyne receiver and allows a user to switch to any input port. An optional electrical power divider 77 may be placed before RF tuner 78 to have many RF tuners select RF channels from the same O/E output receiver from optical subsystem 72. As will be apparent to one skilled in the art, different configurations could be used to combine wide-band analog signals, but coupling the approach used in RF subsystem 74 with optical subsystem 72 creates a larger, improved analog switch. A preferred embodiment implements M=8 channels per E/O transmitter with components having 10 to 20 GHz of bandwidth, and therefore supports a total of 8×8×K input ports.

Figure 4:
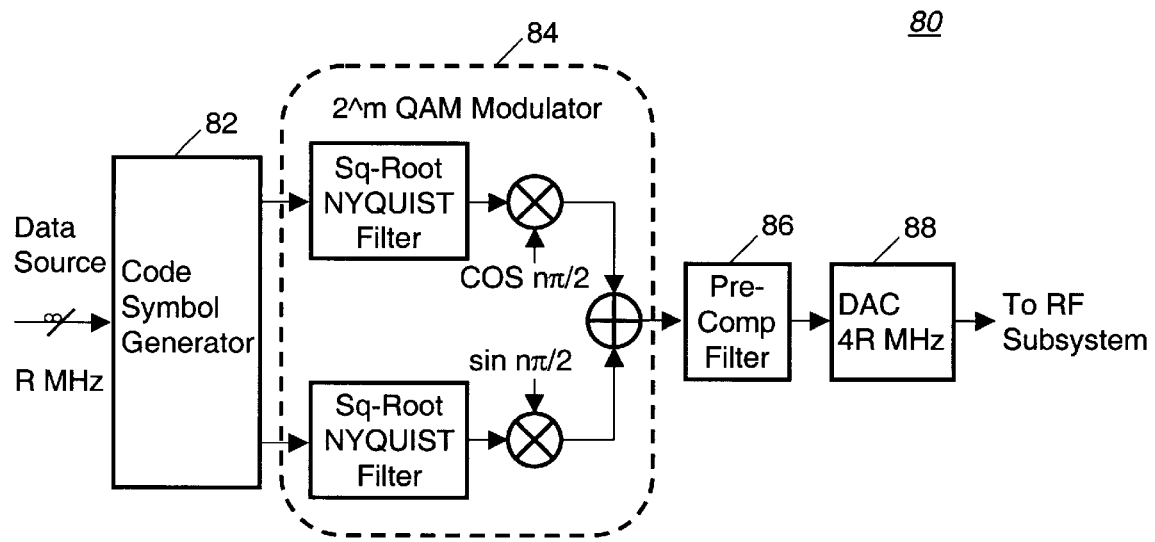
FIG. 4 is a schematic block diagram showing a digital transmitter subsystem which may be used by the opto-electronic circuit switch of the present invention.
Figure 5:
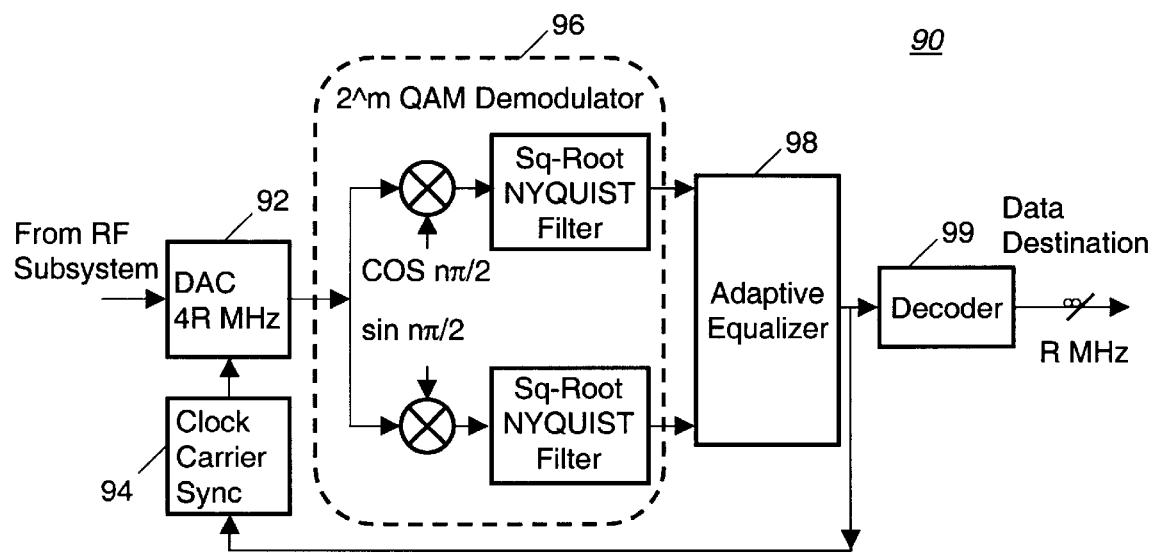
FIG. 5 is a schematic block diagram showing a digital receiver subsystem which may be used with the opto-electronic circuit switch of the present invention.

To interface with digital signals, each of the RF input channels is connected to a digital transmitter subsystem and each of the RF tuners is connected to a digital receiver subsystem. FIGS. 4 and 5 show digital transmitter subsystem 80 and digital receiver subsystem 90, respectively. Digital transmitter subsystem 80 encodes and modulates digital data sources using quadrature amplitude modulation (QAM) transmission techniques to create wide-band analog signals. In FIG. 4, digital transmitter subsystem 80 comprises a code symbol generator 82, a QAM modulator 84, a pre-compensation filter 86 and a digital-to-analog converter 88. QAM allows us to maximize the bandwidth utilization of each RF channel. For instance, a preferred 500 MHz channel can fit 2.4 Gbps, so that a switch with 8 frequency division multiplexed channels allows for 19.2 Gbps per wavelength. Similarly, digital receiver subsystem 90 demodulates and decodes the selected analog signal. In FIG. 5, digital receiver subsystem 90 comprises an analog-to-digital converter 92, a clock recoverer and carrier synchronizer 94, a QAM demodulator 96, an adaptive equalizer 98 and a decoder 99. As will be apparent to one skilled in the art, other configurations and digital modulation and transmission techniques could be used to implement these digital interfaces.

The foregoing discloses and describes merely exemplary embodiments of the present invention. One skilled in the art will readily recognize from such discussion, and from the accompanying drawings and claims, that various changes, modifications and variations can be made therein without departing from the spirit and scope of the present invention.

What is claimed is:

1. A circuit switch for routing a plurality of signals, said circuit switch comprising:
    a signal combining device receiving a first optical input signal at a first wavelength and a second optical input signal at a second wavelength and combining said first optical signal and said second optical signal into an optical output signal using wavelength division multiplexing;
    an equalizer for receiving said optical output signal from said combining device;
    an amplifier for receiving said optical output signal from said equalizer and amplifying said optical output signal, said equalizer serving to pre-compensate for non-flat gain response characteristics of said amplifier;
    a splitting device receiving said optical output signal from said combining device and broadcasting a plurality of said optical output signals; and
    at least two optical receivers, each receiving one of said optical output signals from said splitting device, whereby at least one of said optical receivers selects at least one of said first optical input signal and said second optical input signal by tuning to its wavelength.

2. The circuit switch of claim 1 further comprising a first input transmitter receiving a first electrical input signal and converting said first electrical input signal into said first optical input signal at a first wavelength; and a second input transmitter receiving a second electrical input signal and converting said second electrical input signal into said second optical input signal at a second wavelength.

3. The circuit switch of claim 2 wherein each of said optical receivers includes a tunable optical filter for receiving said optical output signal, and selecting at least one of said first optical input signal and said second optical input signal by tuning to its wavelength; and an output receiver receiving said selected optical signal, and converting said selected optical-signal into an electrical output signal.

4. The circuit switch of claim 3 further including an RF transmitter subsystem receiving at least two RF input channels, wherein each of said RF input channels transmits an RF input signal, combining said RF input signals into an electrical input signal using frequency division multiplexing, and transmitting said electrical input signal to each of said input transmitters.

5. The circuit switch of claim 4 further including a digital transmitter subsystem for transmitting an RF input signal to one of said RF input channels of said RF transmitter subsystem by receiving a digital input signal, modulating said digital input signal using quadrature amplitude modulation and converting said digital input signal into said RF input signal.

6. The circuit switch of claim 4 further including an RF tuner receiving said electrical output signal from one of said optical receivers, for selecting at least one of said RF input signals and for receiving a selected electrical signal.

7. The circuit switch of claim 6 further including a digital receiver subsystem receiving said selected electrical signal from said RF tuner, converting said selected electrical signal into a digital output signal and demodulating said digital output signal into an output signal.

8. The circuit switch of claim 1 further comprising a plurality of optical transmitter subsystems for receiving a plurality of input signals, each of said optical transmitter subsystems including:
    a signal combining device receiving a first optical input signal at a first wavelength and a second optical input signal at a second wavelength and combining said first optical signal and said second optical signal into an optical output signal using wavelength division multiplexing; and
    a splitting device receiving said optical output signal from said combining device and broadcasting a plurality of said optical output signals.

9. The circuit switch of claim 8 wherein each of said optical receivers includes a switch for selecting said optical output signal from at least one of said optical transmitter subsystems.

10. A circuit switch for routing a plurality of signals, the plurality of signals having at least a first electrical input signal and a second electrical input signal, said circuit switch comprising:
    a first input transmitter receiving said first electrical input signal and converting said first input signal into a first optical input signal at a first wavelength;
    a second input transmitter receiving a second electrical input signal and converting said second input signal into a second optical input signal at a second wavelength;
    a multiplexer receiving said first optical input signal and said second optical input signal, and combining said first optical signal and said second optical signal into an optical output signal using wavelength division multiplexing;
    an equalizer for receiving said optical output signal from said multiplexer;
    an amplifier for receiving said optical output signal from said equalizer and optically amplifying said optical output signal, said equalizer serving to pre-compensate for non-flat gain response characteristics of said amplifier;
    a splitter receiving said optical output signal from said amplifier and broadcasting a plurality of said optical output signals; and
    at least two optical receivers, each receiving one of said optical output signal from said splitter, whereby at least one of said optical receivers selects at least one of said first optical input signal and said second optical input signal by tuning to its wavelength and converts the selected optical signal into an electrical output signal.

11. The circuit switch of claim 10 further comprising a plurality of optical transmitter subsystems for receiving a plurality of input signals, each of said optical transmitter subsystems including:
    a first input transmitter receiving a first electrical input signal and converting said first input signal into a first optical input signal at a first wavelength;
    a second input transmitter receiving a second electrical input signal and converting said second input signal into a second optical input signal at a second wavelength;

a multiplexer receiving said first optical input signal and said second optical input signal, and combining said first optical input signal and said second optical input signal into an optical output signal by using wavelength division multiplexing;

an amplifier receiving said optical output signal from said multiplexer and optically amplifying said optical output signal; and a splitter receiving said optical output signal from said amplifier and broadcasting a plurality of said optical output signals.

12. The circuit switch of claim 11 wherein each of said optical receivers includes a switch for selecting said optical output signal from at least one of said optical transmitter subsystems.

13. The circuit switch of claim 10 wherein said amplifier is further defined as an erbium-doped fiber amplifier for optically amplifying said optical output signal.

14. The circuit switch of claim 10 wherein each of said optical receivers includes a tunable optical filter for receiving said optical output signal, and selecting at least one of said first optical input signal and said second optical input signal by tuning to its wavelength; and an output receiver receiving said selected optical signal, and converting said selected optical signal into an electrical output signal.

15. The circuit switch of claim 14 wherein each of said optical receivers further includes an amplifier receiving said selected optical signal from said tunable optical filter, and optically amplifying said selected optical signal; and a second tunable optical filter receiving the amplified optical signal from said amplifier, and reducing optical noise and crosstalk.

16. The circuit switch of claim 15 wherein said amplifier of said optical receiver has automatic gain control for maintaining the power of said selected optical signal as required by said output receiver.

17. The circuit switch of claim 14 wherein each of said optical receivers further includes a variable optical attenuator for maintaining the power of said selected optical signal as required by said output receiver.

18. The circuit switch of claim 10 further including an RF transmitter subsystem receiving at least two RF input channels, wherein each of said RF input channels transmits an RF input signal, combining said RF input signals into an electrical input signal using frequency division multiplexing, and transmitting said electrical input signal to each of said input transmitters.

19. The circuit switch of claim 18 further including a digital transmitter subsystem for transmitting an RF input signal to one of said RF input channels of said RF transmitter subsystem by receiving a digital input signal, modulating said digital input signal using quadrature amplitude modulation and converting said digital input signal into said RF input signal.

20. The circuit switch of claim 18 further including a divider receiving said electrical output signal from one of said optical receivers, and an RF tuner selecting at least one of said RF input signals.

21. The circuit switch of claim 20 further including a digital receiver subsystem receiving said selected electrical signal from said RF tuner, converting said selected electrical signal into a digital output signal and demodulating said digital output signal into an output signal.

22. A method for routing data signals in a circuit switch, comprising the steps of:

receiving a plurality of electrical input signals into an optical transmitter subsystem;

converting said electrical input signals into a plurality of optical signals, including a first electrical input signal converted into a first optical signal at a first wavelength and a second electrical input signal converted into a second optical signal at a second wavelength;

combining said plurality of optical signals into an optical output signal using wavelength division multiplexing;

pre-compensating said optical output signal for non-flat gain response characteristics of an amplifier;

amplifying, with said amplifier, said optical output signal into an amplified signal;

splitting said amplified signal into a plurality of optical output signals;

transmitting one of said plurality of optical output signals to each of at least two optical receivers, thereby providing full broadcasting;

selecting at least one of said first optical input signal and said second optical input signal from said optical output signal by tuning to its wavelength; and converting the selected optical signal into an electrical output signal.

23. The method of claim 22 wherein each of said optical receivers includes a tunable optical filter for receiving one of said optical output signals and selecting at least one of said first optical input signal and said second optical input signal from said optical output signal by tuning to its wavelength; and an output receiver for converting said selected optical signal into an electrical output signal.

24. The method of claim 23 further comprising the step of replacing at least one of said input transmitters and said ouput receiver for upgrading bandwidth of the circuit switch.

25. The method of claim 23 further comprising the step of adding at least one of said input transmitter and said output receiver for backwards compatibility of the circuit switch.

26. The method of claim 22 wherein said step of receiving a plurality of electrical input signals further comprises a plurality of optical transmitter subsystems, whereby each of said optical transmitter subsystems receives a plurality of electrical input signals and transmits a plurality of optical output signals to each of said optical receivers, thereby increasing inputs while maintaining non-blocking and full broadcasting of the circuit switch.

27. The method of claim 26 wherein each of said optical receivers further includes a switch for selecting one of said optical output signals from at least one of said optical transmitter subsystems.

28. The method of claim 22 further comprising the step of adding at least one said optical receiver, thereby increasing outputs while maintaining non-blocking and full broadcasting of the circuit switch.

29. The method of claim 22 further comprising the steps of:

receiving a plurality of RF input signals into an RF transmitter subsystem;

combining said plurality of RF input signals into an electrical input signal using frequency division multiplexing; and transmitting said electrical input signal to each of said input transmitters.

30. The method of claim 29 further comprising the steps of:

receiving a plurality of digital input signals into a digital transmitter subsystem;

modulating each of said digital input signals using quadrature amplitude modulation;

converting each of said modulated digital signals into a plurality of RF input signals; and transmitting said plurality of RF input signals to said RF transmitter subsystem.

31. The method of claim 30 further comprising the step of selecting at least one of said RF input signals from said electrical output signal using an RF tuner.

32. The method of claim 31 further comprising the steps of:

receiving said selected RF signal into a digital receiver subsystem;

converting said selected RF signal into a digital signal; and demodulating said digital signal into an output signal.

33. A circuit switch for routing a plurality of signals, said circuit switch comprising:

a plurality of optical transmitter subsystems for receiving a plurality of optical input signals, each of said optical transmitter subsystems including:

a signal combining device receiving a first optical input signal at a first wavelength and a second optical input signal at a second wavelength and combining said first optical signal and said second optical signal into an optical output signal using wavelength division multiplexing, and a splitting device receiving said optical output signal from said combining device and broadcasting a plurality of said optical output signals; and at least two optical receivers for receiving one of said optical output signals from one of said optical transmitters, each of said optical receivers including:

ad a switch for selecting one of said optical output signals from one of said optical transmitters, ad a tunable optical filter receiving said optical output signal and selecting at least one of said first optical input signal and said second optical input signal by its wavelength, and ad an output receiver receiving said selected optical signal and converting said selected optical signal into an electrical output signal.

* * * * *